United States Patent Office 2,794,711
Patented June 4, 1957

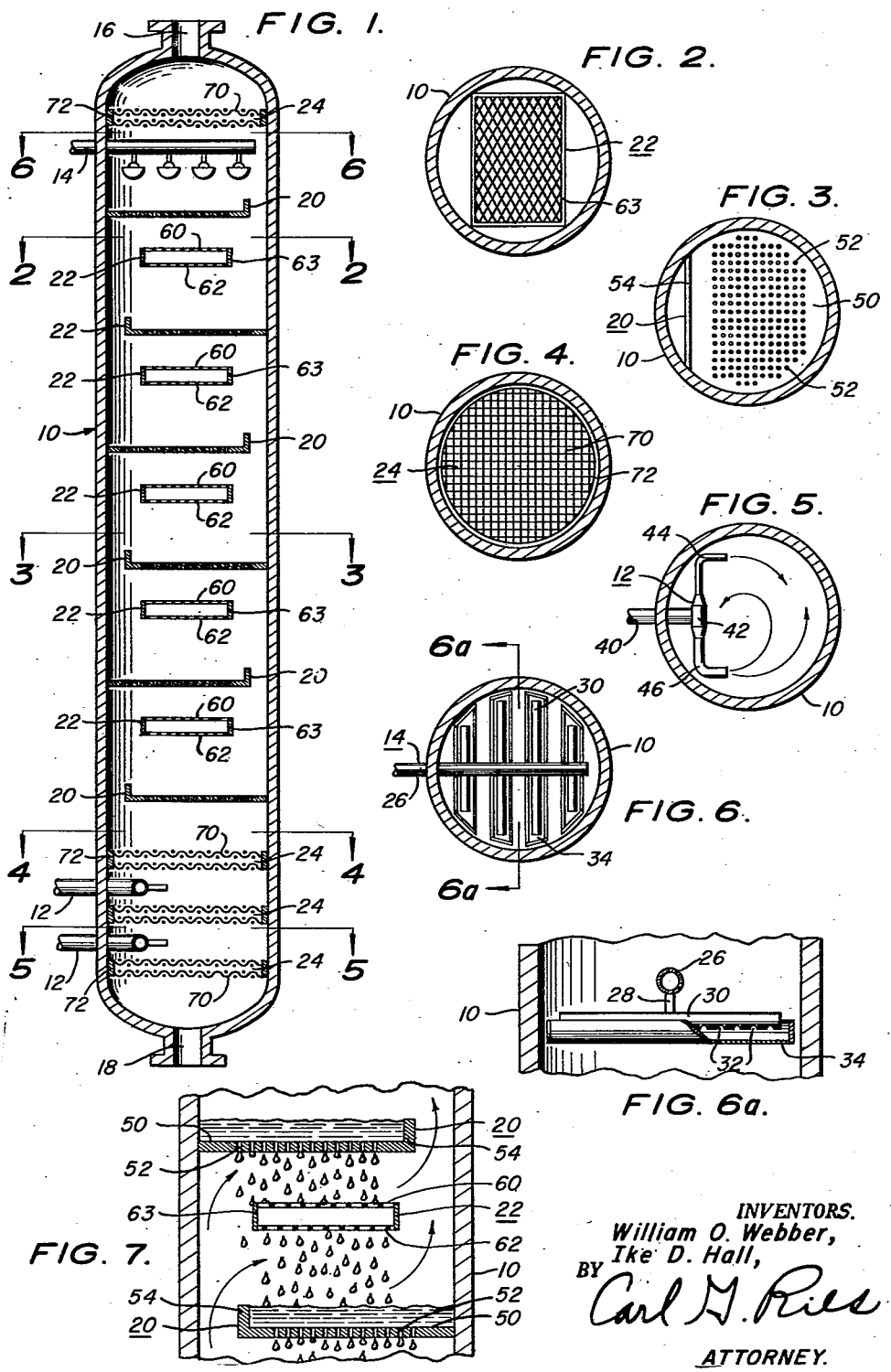

2,794,711

LIQUID-LIQUID COUNTERCURRENT CONTACTING DEVICE

Ike D. Hall and William O. Webber, Baytown, Tex., assignors, by mesne assignments, to Esso Research and Engineering Company, Elizabeth, N. J., a corporation of Delaware Application November 17, 1955, Serial No. 547,355

5 Claims. (Cl. 23—270.5)

This invention relates to a device for use in bringing separate liquid streams into intimate countercurrent contact. More particularly, the present invention relates to a liquid-liquid countercurrent contact device for obtaining high velocity, high plate efficiency countercurrent contact between separate liquid streams.

At the present time there are a great many chemical processes wherein immiscible or partially miscible liquids are brought into intimate contact in order to secure a partial segregation or removal of chemical constituents from one of the liquids into the other liquid. For example, petroleum lubricating oil fractions are conventionally treated with liquid solvents such as liquefied sulfur dioxide, phenol, cresol, nitrobenzene, furfural, aniline, etc. or mixtures thereof in order to remove from the lubricating oil fraction low viscosity index constituents, whereby a lubricating oil of improved viscosity index is obtained. As another example, asphalt-containing petroleum residual fractions to be subjected to catalytic cracking operations are brought into intimate contact with selective solvents for the non-asphaltic constituents of the residual fraction such as, for example, liquefied normally gaseous hydrocarbons including ethane, ethylene, and mixtures thereof, propane, butane, and mixtures thereof, etc., whereby the desirable constituents for catalytic cracking are removed from the asphaltic material contained in the residual fraction.

It has been found advantageous to effect large volume interliquid treating operations of this nature in contacting towers. In order to obtain effective results, liquid-liquid contact towers should be constructed to provide for the repeated sequential steps of efficiently mixing the liquids and then effectively separating the mixed liquids. This is normally accomplished by initially dispersing one of the liquids in the other of the liquids and by providing a plurality of contact plates in the tower for periodically collecting the dispersed liquid and for then redispersing the same in the continuous phase liquid. For the best results it is desirable that the liquid employed in continuous phase be initially intimately mixed with the dispersed phase liquid and that thereafter the dispersed phase be periodically separated from and redispersed in the continuous phase liquid by means of the contact plates, whereby the tower may have a high plate efficiency. Plate efficiency, as that term is used, denotes the reciprocal tower height required to obtain the contacting efficiency obtainable with a theoretical plate and is expressed as the tower height equivalent to a theoretical plate. A theoretical plate may be defined as a plate giving the efficiency of contact which can be achieved in a single stage, equilibrium batch mixer and settler. The value for one theoretical plate is established by contacting two liquids intimately in a batch mixer followed by thorough settling in a batch settler.

It is also desirable, from the point of view of efficiency, that high plate efficiency be accompanied by high velocity flow, whereby satisfactory quantities of the two liquids may be brought into intimate contact at reasonable rates of flow. Normally, however, plate efficiency and velocity are antithetically related. For example, maximum flow velocity can be obtained between countercurrently flowing liquid streams in an empty tower but contact between the streams is minimized and, consequently, plate efficiency is low. On the other hand, high plate efficiency can be obtained in a tower packed with a finely divided solid material, such as sand, but flow velocity is extremely low.

An object of the present invention is the provision of a countercurrent liquid-liquid contacting device wherein high velocity and high plate efficiency are achieved.

Another object of the present invention is the provision of a liquid-liquid countercurrent contacting tower having improved means for initially intimately mixing an introduced continuous phase liquid with a dispersed phase liquid.

A further object is the provision of a liquid-liquid countercurrent contacting tower comprising perforate contact plates and means associated therewith for substantially increasing the plate efficiency of such contact plates.

These and other objects are attained, in general, through the provision of a device for intimately countercurrently contacting a first liquid in continuous phase with a second liquid in dispersed phase comprising (1) an elongate vertical shell, (2) first means adjacent one end of said shell for introducing said first liquid thereinto as a continuous phase, (3) second means adjacent the other end of said shell for introducing said second liquid into said shell and for dispersing same into said first liquid, (4) a plurality of vertically spaced, horizontal disposed, cupped perforate contact plates intermediate said first and second means for sequentially collecting said dispersed second liquid and for again dispersing the same in said first continuous phase liquid, (5) perforate horizontally disposed redispersion baffles intermediate each adjacent pair of said contact plates and (6) withdrawal means adjacent opposite ends of said shell for removing said first and second liquids subsequent to countercurrent contacting operations, each of said redispersion baffles comprising a plurality of closely spaced perforate plates, the plates of said dispersion baffles having greater open areas than the open areas of said perforate plates, said first means comprising a pair of horizontally disposed, differentially sized jets on opposite sides of said shell for introducing said first liquid in separate, equal velocity, differential volume flow streams.

The manner in which the objects of the present invention are attained will be more clearly apparent from the following detailed description and the accompanying drawings wherein:

Fig. 1 is a sectional side elevational view of a liquid-liquid contacting tower constructed in accordance with a preferred embodiment of the present invention;

Fig. 2 is a cross-sectional view taken along the lines 2—2 of Fig. 1;

Fig. 3 is a cross-sectional view taken along the lines 3—3 of Fig. 1;

Fig. 4 is a cross-sectional view taken along the lines 4—4 of Fig. 1;

Fig. 5 is a cross-sectional view taken along the lines 5—5 of Fig. 1;

Fig. 6 is a cross-sectional view taken along the lines 6—6 of Fig. 1;

Fig. 6A is a fragmentary side elevational view taken along the lines 6a—6a of Fig. 6; and Fig. 7 is a fragmentary sectional side elevational view to an enlarged scale of a portion of the contacting tower shown in Fig. 1 showing the manner in which liquid-liquid countercurrent flow contact occurs in accordance with the present invention.

Turning now to Fig. 1, the numeral 10 designates generally a vertically disposed elongate shell which is preferably, but not necessarily, of circular cross-section. First distributing means 12 are provided adjacent the bottom of the shell 10 for the introduction of a first liquid thereinto, and second distributing means 14 is provided adjacent the top of the shell 10 for introducing a second liquid thereinto. In this showing, the first liquid is introduced into the shell 10 by the distributing means 12 in continuous phase and the second liquid is introduced into the shell 10 through the second distributing means 14 in dispersed phase. It will be understood that, if desired, the dispersed phase may be introduced at the bottom of the shell 10 and that the continuous phase may be introduced at the top of the shell 10 with equally satisfactory results. It will be further understood that the liquid introduced at the top of the shell 10 will be substantially heavier than the liquid introduced in the bottom of the shell 10, whereby liquid-liquid countercurrent contact is obtained through gravity flow. Thus, for example, the second liquid may comprise as asphalt-containing residual petroleum fraction introduced at the top of the shell 10 through the distributing means 14 and the first liquid introduced at the bottom of the shell 10 through the distributing means 12 may comprise a liquefied normally gaseous hydrocarbon such as propane which is utilized to extract the non-asphaltic constituents from the petroleum residual fraction as a result of countercurrent liquid-liquid contact. It will be further understood that, if desired, one or more additional streams of liquids which may be the same as or different from the first and second streams may also be introduced into the shell 10 at one or more appropriate points intermediate the distributing means 12 and 14; such additional streams being introduced by suitable means (not shown). When one or more additional streams are provided, such streams may be introduced so as to form a part of either the continuous phase liquid or the dispersed phase liquid in the shell 10.

The shell 10 is provided with an outlet 16 at the top thereof for the removal of the lighter, continuous phase liquid and with a conduit 18 at the bottom of the shell 10 for the collection and removal of the heavier, dispersed phase liquid; the outlets 16 and 18 being positioned so that the first and second liquids are withdrawn from the shell 10 after having been brought into intimate countercurrent contact with each other.

The shell 10 is also provided, intermediate the distributing means 12 and 14, with a plurality of vertically spaced, horizontally disposed, cupped perforate contact plates 20. In accordance with the present invention there is also provided a redispersion baffle 22 intermediate each adjacent pair of the contacting plates 20.

The shell 10 may also contain additional means for assisting in liquid countercurrent contacting operations such as, for example, a plurality of screen packs 24. Thus, there may be provided screen packs 24 adjacent the outlets 16 and 18 to assist in the separation and collection of the first and second liquids to be withdrawn from the shell 10.

In accordance with a preferred embodiment of the present invention a plurality of the continuous phase introducing means 14 is provided, and in this instance each of the introducing means 14 is preferably compartmented in the shell 10 intermediate a pair of the screen packs 24.

The means 14 for introducing the second liquid in disperse phase into the shell 10 may be of any suitable construction known to those skilled in the art. Thus, with reference to Figs. 6 and 6A, the means 14 may comprise an inlet pipe 26 provided with a plurality of connecting pipes 28 leading to a like number of distributing pipes 30 provided with a plurality of openings 32 in the bottoms thereof. Each of the distributing pipes 30 is surrounded at the bottom thereof with a semi-circular baffle 34 for assisting in the dispersion of the liquid material introduced into the shell 10 through the inlet 26.

In accordance with the present invention, a novel distributing means 12 is provided for introducing the continuous phase liquid into the shell 10. As is shown more clearly in Fig. 5, the distributing means 12 comprises an inlet pipe 40 terminating in a two-way joint 42. First and second jets 44 and 46 lead from the joint 42 and terminate in parallelism at opposite sides of the shell 10. It will be noted that the jet 44 is of a smaller diameter than the jet 46. The inlet pressure for the jets 44 and 46 should be such that the streams of liquid jetted therefrom will have substantially the same velocity. As a consequence, a substantially larger quantity of liquid will issue from the jet 46 as compared to the jet 44. With this arrangement a flow path of the type shown by the arrows of Fig. 5 is provided. It will be noted that the low volume jet 44 impinges upon (i. e., collides with) the high volume jet 46 to provide positive circulatory motion for the incoming liquid, as distinguished from random circulatory motion.

A typical contact plate 20 of the type shown in section in Fig. 1 is shown in plan view in Fig. 3. Considering Figs. 1 and 3, it will be noted that each of the plates 20 comprises a body portion 50 perforated with a plurality of holes 52 and a chordal, cupped end section 54 which, in this showing, is pointed upwardly. As a consequence, descending dispersed phase liquid is collected on the top of each of the contact plates 20 and retained thereon by means of the cupped end section 54. The thus-collected liquid is redispersed through the openings 52. It will be noted from Fig. 1 that the perforate portions of the contact plates 20 are vertically aligned whereby substantially vertical downward flow of the dispersed phase liquid is maintained. If the liquid to be dispersed is to be introduced in the bottom of shell 10 it will be understood that the chordal end sections 54 will be pointed downwardly whereby the dispersed liquid may be collected on the bottom of the plates 20 and redistributed for upward flow through the holes 52.

The redispersion baffles 22 of the present invention are shown in Fig. 1 and in greater detail in Fig. 2. From Fig. 1 it will be noted that each of the redispersion baffles 22 comprises an upper plate 60 and a lower plate 62, united at the edges by suitable joining means such as a metal band 63 (Fig. 2). The plates 60 and 62 are preferably formed of expanded metal or the like whereby the plates 60 and 62 will have a substantially greater open area than the open area comprising the holes 52 in the contact plates 20. If desired, one or more additional plates (not shown) may be provided intermediate the upper plate 60 and the lower plate 62.

A typical conventional screen pack 24 of the type mentioned above is shown in Fig. 1 and also in greater detail in Fig. 4. From Fig. 1 it will be noted that each of the packs 24 comprises a plurality of screen members 70 united at the edges by any suitable means such as a ring 72 and that, with reference to Fig. 4, the screen members 70 provide a continuous barrier in the interior of the shell 10.

Operation

In conducting liquid-liquid countercurrent contacting operations, the lighter of the two liquids is introduced into the shell 10 through the distributing means 12 adjacent the bottom of the shell 10 and the heavier of the two liquids is introduced into the shell 10 adjacent the top thereof by way of distributing means 14. For example, if a petroleum residual fraction is to be countercurrently contacted with a liquefied normally gaseous hydrocarbon such as propane, the liquefied propane is introduced adjacent the bottom of the shell 10 and the petroleum residual fraction is introduced adjacent the top of the shell 10. Conversely, if a lubricating oil fraction is to be countercurrently contacted with a selective solvent such as phenol, the phenol is introduced adjacent the top of the shell 10 and the lubricating oil fraction is introduced adjacent the bottom thereof.

The denser liquid flows downwardly to the shell 10 to the bottom thereof and is collected at the bottom of the shell 10 for discharge through the opening 18. The lighter fluid flows upwardly through the shell 10 for collection adjacent the top thereof and for discharge through the upper opening 16.

With reference to Fig. 1 of the drawings, the denser liquid is introduced into the shell 10 in dispersed phase by way of the distributing means 14. Thus, with respect to Figs. 6 and 6A, the denser fluid (e. g., an asphalt-containing residual fraction) is fed from a suitable source (not shown) by way of the line 26 into the shell 10. From the inlet pipe 26 the residual fraction flows through the connecting pipes 28 to the distributing pipes 30 and is discharged from the distributing pipes 30 through the openings 32 in the bottoms thereof. The denser liquid next flows over the baffles 34 in the form of fine droplets for descent to the uppermost of the contact plates 20 and are collected thereon to form a body of separated dense liquid above the surface of the contact plate 20. The thus-collected material is redispersed through the openings 52 in the bottom of the contact plate 20 and descends downwardly to the redispersion baffle 22. The droplets pass through the upper plate 60 of the redispersion baffle 22, are temporarily collected in the space between the plates 60 and 62 and again disperse downwardly through the plate 62.

The thus redispersed droplets of the denser dispersed phase liquid then flow downwardly to the next succeeding contact plate 20 where the above-described sequence of operations is repeated.

In this manner the droplets of disperse phase dense fluid descend through the shell 10 to the lower screen packs 24 and, on passage therethrough, come into contact with the incoming stream of continuous phase lighter fluid introduced by the distributing means 12. After passage through the lowermost of the screen packs 24 the denser liquid is again collected and finally discharged from the shell 10 through the opening 18.

The lighter of the two liquids is, as indicated, introduced adjacent the bottom of the shell 10 through the distributing means 12. Thus, and with reference to Fig. 5, half of the total amount of lighter liquid to be introduced into the shell 10 is fed to each of the inlet pipes 40 and thence by way of the joints 42 through the jets 44 and 46. Unbalanced streams of substantially equal velocity but of differential volume are discharged from the jets 44 and 46. A larger volume stream discharged through the jet 46 positively circulates into contact with the smaller volume stream discharged through the yet 44 and, as a result, the liquid between the screen packs 24 is positively circulated. Consequently, "aspiration" or induction of the dispersed phase droplets into the incoming fluid will occur but random recirculation of such dispersed phase droplets is minimized.

The thus introduced lighter phase fluid flows upwardly through the body of the shell 10, past the upper distributing means 14, and through the upper screen pack 24 to the top of the shell 10. The lighter liquid is there collected for discharge through the upper inlet 16. With reference to Fig. 7, it is seen that the ascending liquid flow pattern is both vertically upward and also crosswise with respect to the contact plates 20 and the redispersion baffles 22. As a consequence, the dispersed phase droplets are repeatedly brought into contact with the ascending lighter continuous phase fluid.

It will be noted that a substantial spacing exists between each of the contact plates 20 which is only partially interrupted by the dispersion baffles 22. As a consequence, the ascending fluid will have a comparatively large component of vertical movement. As a consequence, the ascending fluid will have a comparatively high velocity. However, the crosswise component of flow will insure repeated and intimate contact between the descending dispersed phase droplets and the ascending continuous fluid. Due to the efficiency of contact that is obtained in this manner, a comparatively high plate efficiency is attained.

The plate efficiency of the column is also improved by the manner in which the continuous phase fluid is introduced. Considering, for example, the situation involved when an asphalt-containing residual fraction is the dispersed phase fluid, it will be noted that the dispersed phase droplets will have been repeatedly contacted with the ascending fluid prior to descent to the lower portion of the shell 10. As a consequence, a substantial portion of the non-asphaltic components will have been extracted and the dispersed phase droplets at the bottom of the tower will, therefore, contain a much higher percentage of asphalt than the feed material and will, accordingly, be more viscous. As a consequence, molecular diffusion will tend to be retarded. However, positive induction of such droplets into the incoming paths of continuous phase fluid will cause particularly good mixing and contact to occur, and, as a consequence, the most difficult part of the countercurrent contacting operation is conducted with efficiency.

Having described our invention, what is claimed is:

1. A device for intimately countercurrently contacting a first liquid in continuous phase with a second liquid in dispersed phase comprising an elongate vertical shell, first means adjacent one end of said shell for introducing said first liquid thereinto as a continuous phase, second means adjacent the other end of said shell for introducing said second liquid into said shell and for dispersing the same in said first liquid, a plurality of spaced, cupped horizontally disposed perforated contact plates intermediate said first and second means for sequentially collecting said dispersed liquid phase and again dispersing the same in said continuous liquid phase, perforate horizontally disposed redispersion baffles intermediate each adjacent pair of said contact plates, and withdrawal means adjacent opposite ends of said shell for removing said first and second liquids after countercurrent contact, each of said redispersion baffles comprising a plurality of closely spaced perforate plates, the plates of said dispersion baffles having greater open areas than the open areas of said contact plates, said first means comprising a pair of horizontally disposed, differentially sized jets on opposite sides of said shell for introducing said first liquid in separate, equal velocity, differential volume streams.

2. A device for intimately contacting a first liquid in disperse phase comprising an elongate vertical shell of circular cross-section, first means adjacent one end of said shell for introducing said first liquid thereinto as a continuous phase, second means adjacent the other end of said shell for introducing said second liquid into said shell and for dispersing the same in said first liquid, a plurality of spaced horizontally disposed contact plates intermediate said first and second means for collecting said dispersed liquid phase and again dispersing the same in said continuous phase, each of said plates having a perforate portion and a cupped chordal end portion, said perforate portions being vertically aligned, the cupped portion of each of said plates being oppositely disposed with respect to cupped portions of the adjacent plates, perforate horizontally disposed redispersion plates intermediate adjacent pairs of said contact plates vertically aligned with said perforate portions and withdrawal means adjacent opposite ends of said shell for withdrawing contacted liquids, each of said redispersion baffles comprising a pair of closely spaced perforate plates, the plates of said dispersion baffles having greater open areas than the open areas of said perforate zones of said contact plates, said first means comprising an inlet pipe in the side of said shell, and a pair of branched horizontally disposed jet pipes of unequal sizes connected with said inlet pipe and terminating on opposite sides of said shell for introducing said first liquid into said shell in separate, equal velocity, differential volume streams.

3. A device for intimately countercurrently contacting a first liquid in continuous phase with a second liquid in dispersed phase comprising an elongate vertical shell, first means adjacent one end of said shell for introducing said first liquid thereinto as a continuous phase, second means adjacent the other end of said shell for introducing said second liquid into said shell and for dispersing the same in said first liquid, a plurality of perforated contact plates intermediate said first and second means for sequentially collecting the said dispersed phase and again dispersing the same in said continuous liquid phase and withdrawal means adjacent opposite ends of said shell for removing said first and second liquids after countercurrent contact, said first means comprising a pair of horizontally disposed, differentially sized jets on opposite sides of said shell for introducing said first liquid in separate, equal velocity, differential volume streams.

4. A device for intimately countercurrently contacting a first liquid in continuous phase with a second liquid in dispersed phase comprising an elongate vertical shell, first means adjacent one end of said shell for introducing said first liquid thereinto as a continuous phase, second means adjacent the other end of said shell for introducing said second liquid into said shell and for dispersing the same in said first liquid, a plurality of perforated contact plates intermediate said first and second means for sequentially collecting the said dispersed phase and again dispersing the same in said continuous liquid phase and withdrawal means adjacent opposite ends of said shell for removing said first and second liquids after countercurrent contact, said first means comprising an inlet pipe in the side of said shell, and a pair of branched horizontally disposed jet pipes of unequal sizes connected with said inlet pipe and terminating on opposite sides of said shell for introducing said first liquid into said shell in separate, equal velocity, differential volume streams.

5. A device for intimately countercurrently contacting a first liquid in continuous phase with a second liquid in dispersed phase comprising an elongate vertical shell, first means adjacent one end of said shell for introducing said first liquid thereinto as a continuous phase, second means adjacent the other end of said shell for introducing said second liquid into said shell and for dispersing the same in said first liquid, a plurality of perforated contact plates intermediate said first and second means for sequentially collecting the said dispersed phase and again dispersing the same in said continuous liquid phase and withdrawal means adjacent opposite ends of said shell for removing said first and second liquids after countercurrent contact, said first means comprising a plurality of vertically spaced jet assemblies, each of said jet assemblies comprising a pair of horizontally disposed, differentially sized jets on opposite sides of said shell for introducing said liquid in separate, equal velocity, differential volume streams.

References Cited in the file of this patent

UNITED STATES PATENTS

| | | |
|---|---|---|
| 2,710,790 | Rupp et al. | June 14, 1955 |
| 2,721,790 | Olney | Oct. 25, 1955 |